United States Patent [19]

Kirk et al.

[11] Patent Number: 4,998,024
[45] Date of Patent: Mar. 5, 1991

[54] ENERGY CONTROLLING SYSTEM FOR TIME SHIFTING ELECTRIC POWER USE

[75] Inventors: William J. Kirk, Warwick, R.I.; James F. Vaughn, Jr., Seabrook, N.H.; Lloyd R. Slonim, Providence, R.I.

[73] Assignee: Vaughn Manufacturing Corporation, Salisbury, Mass.

[21] Appl. No.: 176,550

[22] Filed: Apr. 1, 1988

[51] Int. Cl.$^5$ .............................................. H04B 3/54
[52] U.S. Cl. ...................................... 307/40; 307/35; 307/38; 307/41; 340/310 R; 340/310 A; 364/483; 364/464.01
[58] Field of Search ..................... 307/125, 34, 35, 36, 307/37, 38, 39, 40, 41; 340/310 R, 310 A, 310 CP; 364/492, 483, 493, 145; 236/46 R

[56] References Cited

U.S. PATENT DOCUMENTS

| | | | |
|---|---|---|---|
| 3,852,726 | 12/1974 | Romanelli | 340/870.02 |
| 4,119,948 | 10/1978 | Ward et al. | 340/870.02 |
| 4,173,754 | 11/1979 | Feiker | 340/310 R |
| 4,185,272 | 1/1980 | Feiker | 340/310 R X |
| 4,200,862 | 4/1980 | Campbell et al. | 307/3 X |
| 4,207,557 | 6/1980 | Gilkeson et al. | 340/870.02 |
| 4,291,375 | 9/1981 | Wolf | 364/483 |
| 4,418,333 | 11/1983 | Schwarzbach et al. | 340/310 R |
| 4,442,319 | 4/1984 | Treidl | 340/310 R |
| 4,511,979 | 4/1985 | Amirante | 307/40 X |
| 4,535,401 | 8/1985 | Penn | 340/310 R |
| 4,593,272 | 6/1986 | Berkowitz | 379/322 X |
| 4,621,336 | 11/1986 | Brown | 364/145 X |
| 4,644,320 | 2/1987 | Carr et al. | 340/310 R |
| 4,646,084 | 2/1987 | Burrowes et al. | 340/310 A X |
| 4,682,169 | 7/1987 | Swanson | 340/310 A X |
| 4,697,180 | 9/1987 | Swanson | 340/310 A X |
| 4,703,306 | 10/1987 | Barritt | 340/310 R X |
| 4,771,185 | 9/1988 | Feron et al. | 307/35 X |
| 4,803,632 | 2/1989 | Frew et al. | 340/310 A X |

Primary Examiner—Paul Ip
Attorney, Agent, or Firm—Lane, Aitken & McCann

[57] ABSTRACT

The disclosed system reduces power use during peak loads by automatically shifting the energization of the water heater to periods of off-peak power use. An energy controller maintains a calendar clock and controls the application of power to an electric water heater so that only on non-holiday weekdays, power to the water heater is interrupted during those periods of the day which have been predetermined to be the periods of peak power usage. The consumer whose water heater is controlled in accordance with the system is provided with an override button so that once a day the consumer may institute an override period to energize his water heater regardless of the peak power usage schedule. The energy controller contains in a microprocessor memory status data which includes the calendar time, a listing of the holidays, the schedule of peak power usage and the override interval. The energy controller is connected to an external module mounted outside the dwelling enclosure and by which a portable programming unit may be interconnected to the energy controller. By means of the portable programming unit, the accuracy of the status data can be verified or can be amended.

12 Claims, 9 Drawing Sheets

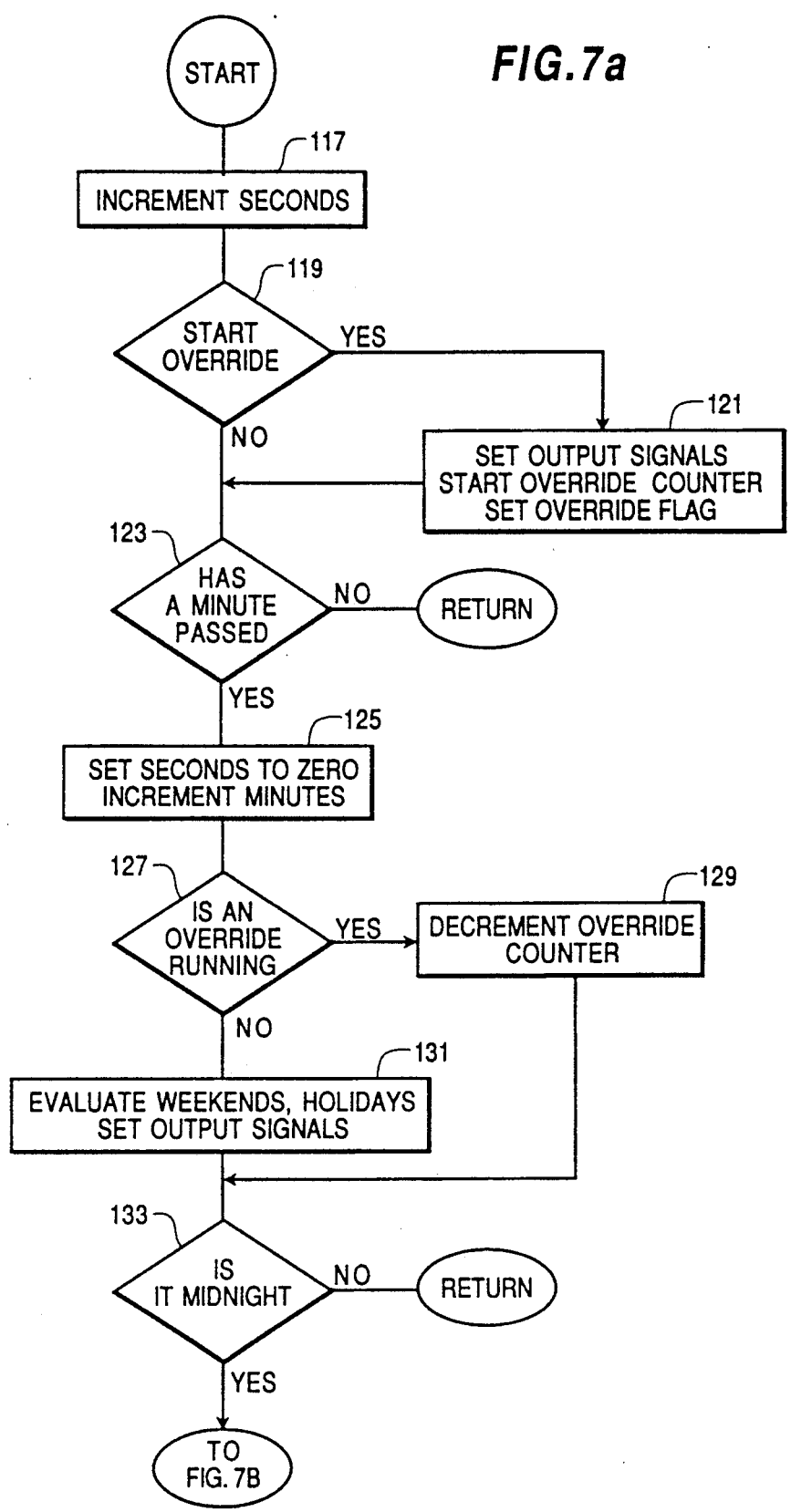

4,998,024

ENERGY CONTROLLING SYSTEM FOR TIME SHIFTING ELECTRIC POWER USE

This invention relates to a system for controlling the use of power by power consumers so as to limit the amount of the power being used during periods of peak power usage, particularly as applied to electric water heaters.

BACKGROUND OF THE INVENTION

Electric utilities need to have a power generating capacity sufficient to supply the peak load on the power generating system. The peak load varies both daily and seasonally and the cost of providing power has a direct relationship with the peak daily load as well as the peak seasonal load. To reduce costs, it is highly desirable, to the extent possible, to transfer power use on a daily basis from the periods of peak load to periods of off-peak load. One electrical appliance which is particularly suitable for shifting the time that it is energized is the electrical water heater. Conventional electrical water heaters are equipped with a thermostat which turn the heating element of the water heater on and off in accordance with the temperature of the water in the tank and accordingly, are turned on and off without any regard to the periods of peak load intervals for power use. On the other hand, the use of electrical power to energize the heating element and heat the water in the water heater can be delayed with little or no inconvenience to the consumer. The reason for this fact is that when hot water is used from a hot water tank, it is replaced by cold water in the bottom of the tank, but the cold water does not mix with the hot water. As a result, most of the hot water can be drawn from the tank without any noticeable drop in the temperature of the hot water being drawn off. Thus, a time shifting of the energization of the heating element to an off-peak time period will in most instances, not inconvenience the user who can still draw an amount of hot water during the peak period approaching the capacity of the water heater tank. This fact is particularly true when the water heater tank is of thermal storage type, which has a large capacity.

SUMMARY OF THE INVENTION

The present invention provides a system for automatically controlling the power applied to an electric water heater so that on week days, power will not be applied to the water heater at certain times during the day determined by the power company to be times of peak load. As soon as the peak load period ends, the power is restored to the water heater and the thermostat will resume control of the heating of the water in the water heater in accordance with water temperature. Thus, on week days the energization of the water heater is time shifted to off-peak load periods. On weekends and holidays the water heater is controlled by the thermostat in the conventional manner and power is not interrupted to the water heater by the system of the invention. As pointed out above, since the temperature of the hot water coming from the tank, does not drop appreciably until the amount of hot water drawn from the tank approaches the capacity of the tank, this shifting of the energization of the water heater in most instances will not inconvenience the user. To further reduce any chance of inconvenience, each unit is provided with an override button by which the energy controller can be overridden and power applied to the thermostatically controlled water heater for a predetermined time interval regardless of whether the period is a peak load period or not. The user is permitted by the system to perform this override function only once during each 24 hour day.

The energy controller will be mounted on or near the water heater. In order to facilitate the monitoring and changing of status data in the energy controller such as the holidays, the starting and ending of subyearly intervals, peak power schedules for the subyearly intervals, or correct the time or date, the energy controller is connected to a remote outdoor module. The outdoor module contains a signal light which is caused to blink by the energy controller signalling that the controller is operating. The outdoor module contains an infrared signal light interface connectable to a portable programing unit. The portable programming unit contains means to compare the status data stored in the energy controller with status data contained in the programming unit and provide an indication of whether or not the comparison is correct. Alternatively, the programming unit may be operated to substitute the status data contained in the programming unit for that in the energy controller and in this manner, change the status data in the energy controller.

BRIEF DESCRIPTION OF THE DRAWINGS

FIGS. 7a and 7b illustrate a flowchart of a time keeping routine employed in the program of FIG. 6;

DESCRIPTION OF A SPECIFIC EMBODIMENT

Figure 1:
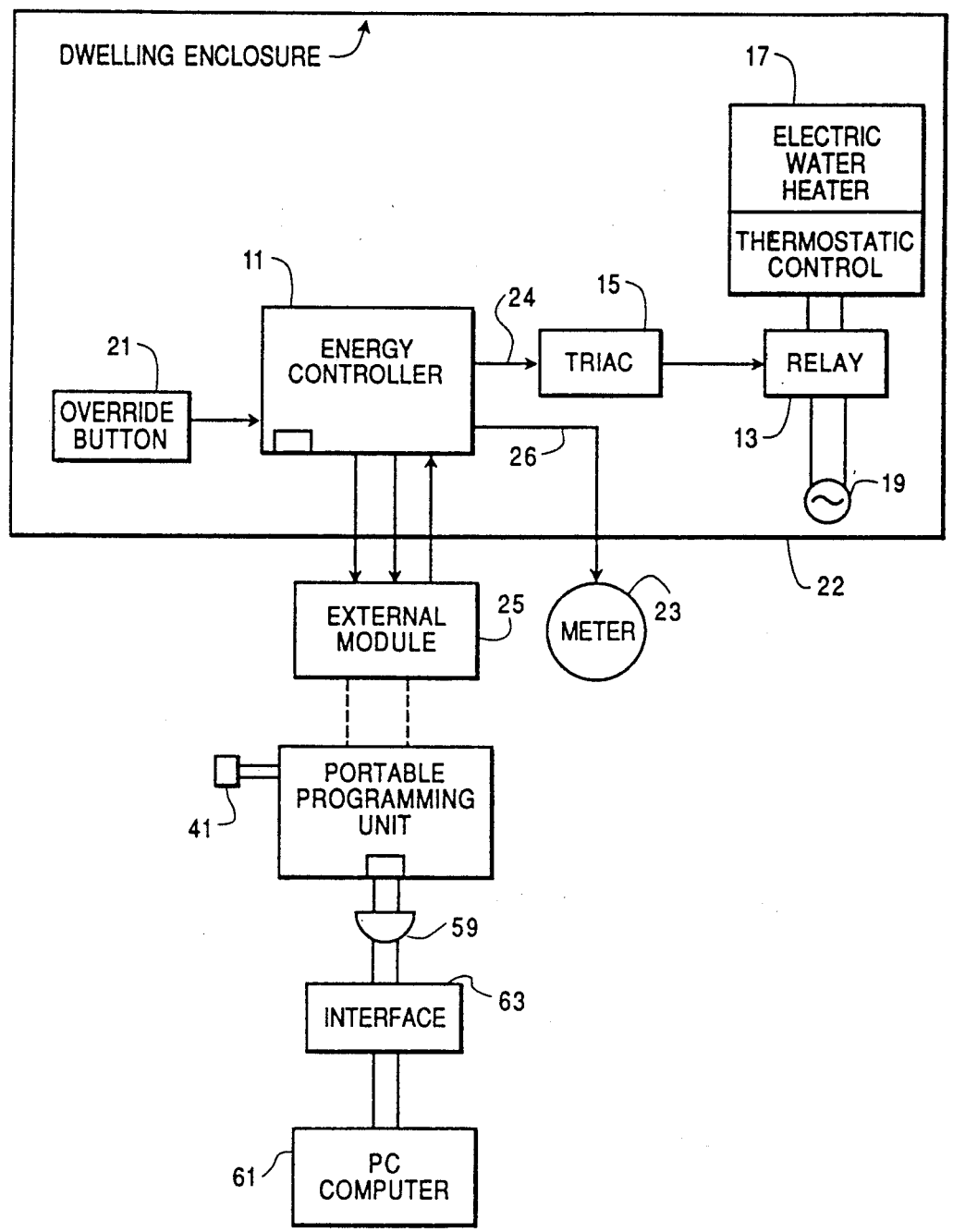
FIG. 1 is a schematic block diagram illustrating the system of the invention.

In the system of the invention as shown in FIG. 1, the energy controller 11 maintains a calendar clock and controls the energization of a relay 13 via a triac 15. The relay 13 controls the application of power to a conventional thermostatically controlled electric water heater 17. When the relay 13 is energized, power is applied from the electric power source 19 to the water heater 17, and the turning on and off of the element of the water heater will be under the control of the thermostat of the water heater in accordance with the water temperature. When the energy controller 11 from the calendar clock determines that it is a peak period of power use on an appropriate day, it will produce a power off output signal on line 24 to the triac 15, which will deenergize the relay 13 to interrupt the power supply to the water heater, so that the heating element of the water heater cannot be energized. As soon as energy controller determines that the peak power period has ended, the energy controller 11 will produce a power on signal on line 24, and the triac 15 will energize the relay 13 to again apply power from the source 19 to the water heater, which at that time may apply the power to the heating element depending upon whether the thermostat of the water heater calls for heating The energy controller 11 is provided with an override button 21. If the energy controller 11 determines that the override button 21 has been actuated and that this is the first time that the override button 21 has been actuated during that day, the energy controller 11 will produce a power on signal on line 24 to energize the relay 13 so that power is applied to the water heater 17, regardless of the calendar clock time, for a predetermined time period set by the power company. If the power company does not want to provide the consumer with the override option, the predetermined override time period is set to zero.

The electric meter in the preferred embodiment of the invention is a two rate meter wherein the consumer is charged at a higher rate for power consumed during peak load periods and charging at a lower rate during off-peak load periods. To achieve this variation in charge, the electric meter 23 receives a signal from the energy controller 11 on output line 26 which may be either a high charge signal or a low charge signal, and the meter 23 responds to this signal to charge the consumer at the high charge rate or low charge rate. The energy controller applies the high charge rate signal to the meter on line 26 whenever it produces the power off signal on output line 24 or whenever it is in an override period in response to the override button being actuated. At all other times, the energy controller will apply the low charge rate signal to the meter 13.

The water heater will normally be within the dwelling enclosure 22 of the consumer and the meter 23 will be outside the dwelling enclosure on a wall of the dwelling. Also outside the dwelling enclosure 22 adjacent to the meter 23 is an external module 25 having a signal lamp, an infrared photodetector, and an infrared signal light beam transmitter. The energy controller causes the signal lamp to blink on and off whenever the energy controller is operating, at two different blink rates. It causes signal lamp to blink on and off at a slow rate when the energy controller 11 is applying the low charge rate signal to the meter 23 and causes the signal lamp to blink at a fast rate whenever the energy controller is applying the high charge rate to the meter. Thus, the rate of blinking of the signal lamp 27 will indicate whether the meter 23 is running at the high charge rate or the low charge rate with the higher frequency blinking indicating the higher charge rate.

A portable programming unit 27 has a recess adapted to receive and fit with the external module 25. The recess is provided with an infrared light beam transmitter and an infrared photodetector and when the module is received in the recess, the infrared light transmitter in the recess will line up with the infrared photodetector in the external module 25 and the infrared photodetector in the recess will line up with the infrared light beam transmitter of the module 25. A serial digital pulse signal can be generated by the portable programming unit 27 to energize the infrared beam signal transmitter in the recess and cause corresponding pulses to be generated by the photodetector in the external module 25 and be transmitted to the energy controller 11. In this manner, data can be transmitted from the portable programmer 27 to the energy controller 11. Similarly pulses generated by the energy controller 11 can energize the infrared light beam transmitter in the module 25, to cause corresponding pulses to be generated by the infrared photodetector in the recess and to be received by the portable programmer 27. In this manner, messages generated by the energy controller 11 are transmitted to the portable programmer 27.

Figure 2:
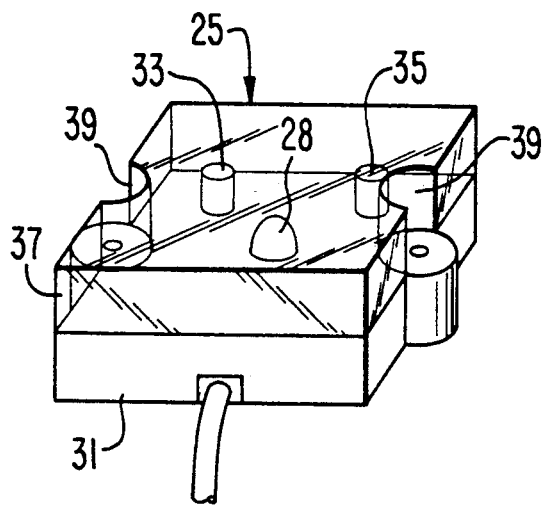
FIG. 2 is a perspective view of an external module employed in the system of the invention.
Figure 3:
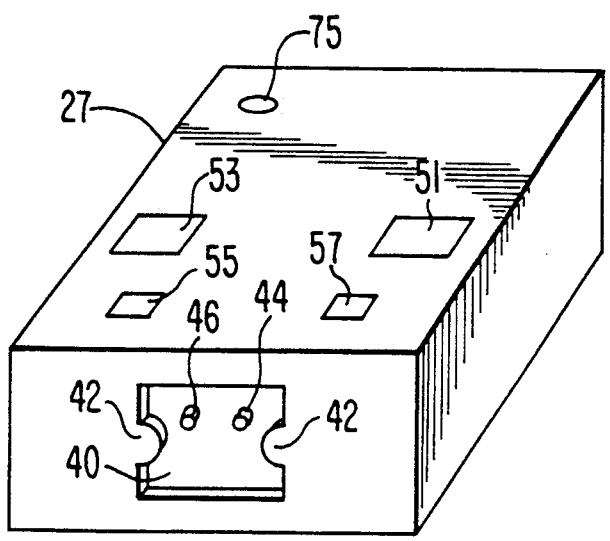
FIG. 3 is a perspective view of a portable programming unit employed in the system of the present invention.

As shown in more detail in FIG. 2, the external module 25 comprises a base 31 in which the blinking signal lamp 28 is mounted. Also mounted on the base 31, is an infrared light beam transmitter 33 and an infrared photodetector 35. The top of the base 31 is covered with a transparent layer 37 which encapsulates the signal lamp 28, the infrared transmitter 33 and the infrared photodetector 35. As shown in FIG. 3, the front wall of the programming unit 27 has a recess 40 defined therein shaped to receive and fit with the transparent layer 37 of the module 25. The recess 40 has on its sidewalls semicircular ribs 42 which, line up with the semicircular recesses 39 and fit in the recesses 39. The module 25 and recess 40 are shaped so that the module will fit in the recess in only one orientation. When the programming unit 27 is coupled to the external module 25 in this manner, an infrared light beam transmitter 46 in recess 40 will be aligned with the photodetector 35 so that when the transmitter 44 is energized, the light beam pulses will be transmitted through the transparent layer 37 to the photodetector 35. Similarly an infrared photodetector 44 in the recess 40 will be aligned with the infrared transmitter 33 and when the transmitter 33 is energized, light beam from the transmitter 33 will be transmitted through the transparent layer 37 to the photodetector 44.

Figure 4:
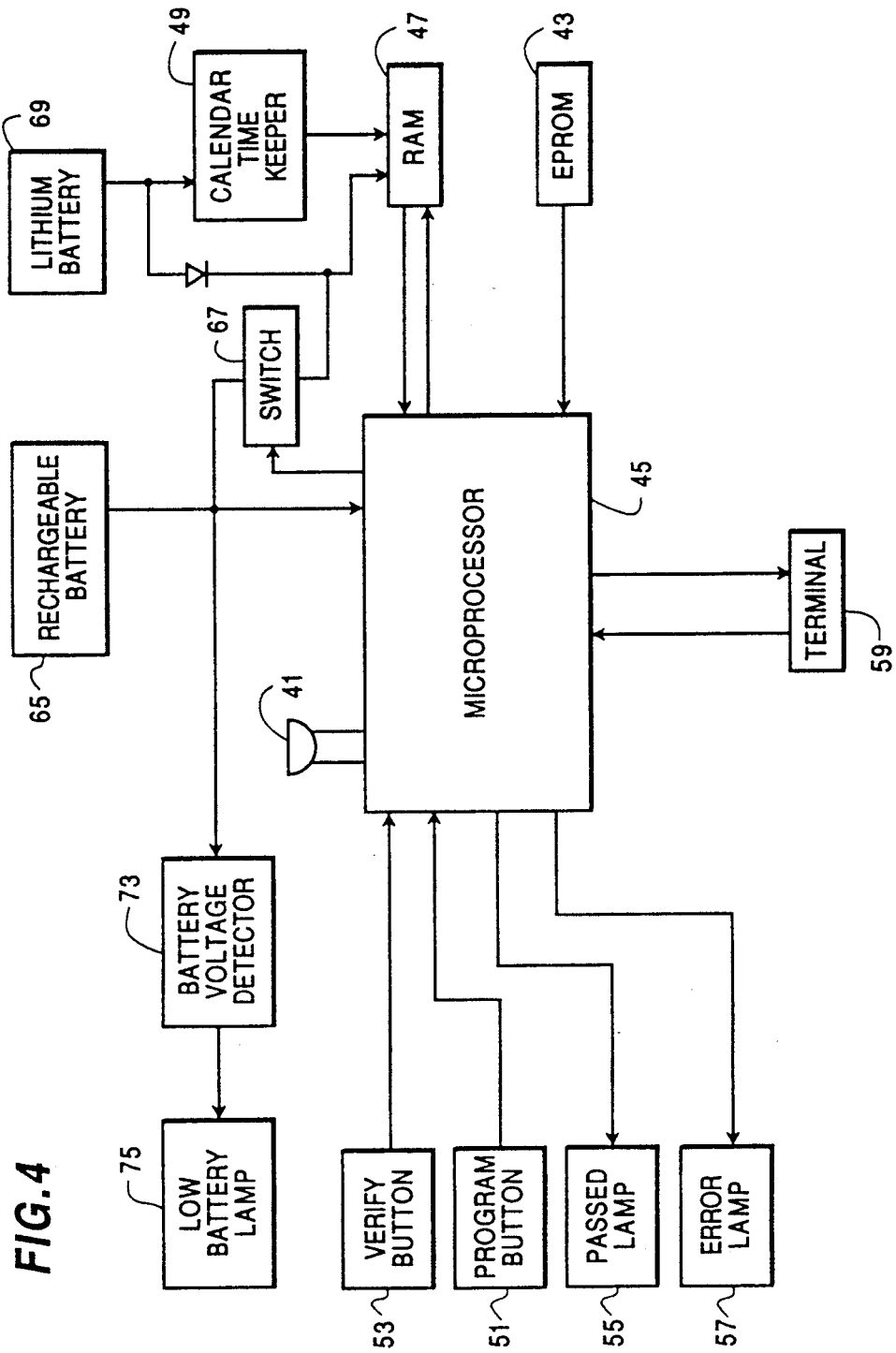
FIG. 4 is a block diagram illustrating the circuitry employed in the programming unit shown in FIG. 3.

The portable programming unit 27, as shown in FIGS. 1 and 4, is provided with a serial signal plug 41 which is designed to plug into a socket in the energy controller 11 so that the portable programming 27 can transmit and receive information directly instead of transmitting and receiving through the remote outside module 25. As shown in FIG. 4, the portable programming unit comprises a microprocessor 45, which is controlled by a program stored in an EPROM 43, which is a reprogrammable read only memory. The portable programming unit has a random access memory or RAM 47 and the microprocessor 45 can store information or read out information from the RAM 47 under the control of the program in the EPROM 43. In addition, the programming unit has a calendar time keeper 49 which keeps the calendar time The calendar time keeper 49 is an off-the-shelf item sold under the name "Smart Watch" available from Dallas Semiconducter.

As shown in FIG. 3, the programming unit 27 has two panel buttons 51 and 53 labelled "program" and "verify" respectively. When the portable programmer 27 is connected to the energy controller either via the external module 25, or by the plug 41 and the button 53 is actuated, the microprocessor 45 will send a message to the energy controller 11 requesting the status data from the energy controller 11. In response to receiving this message, energy controller 11 will send back to the portable programmer 27, all of its status data, which as pointed above will include all of its calendar time information. In addition, the status data includes a list of holidays stored in the energy controller, the dates for changing between daylight savings time and standard time, the starting and ending days for each yearly subinterval, the peak power schedule for each yearly subinterval, and the length of the override interval. All of this status data is compared with corresponding information stored in the RAM 47 or kept by the calendar time keeper 49. If the status data received from the energy controller 11, other than the time of day, is identical to that kept in the programming unit and the time of day received is within 12 minutes of the time kept by the calendar time keeper, the microprocessor 45 determines that the status data in the energy controller 11 has been verified and accordingly, energizes a signal lamp 55 on the top panel of the programming unit 27 labelled "passed". If the status data received from the energy controller 11, with the exception of the time of day, is not identical to the corresponding status data in the programming unit, or if the time of day received from the energy controller 11 is not within 12 minutes of the time of day kept in the programming unit, the microprocessor 45 will energize a lamp 57 on the top panel of the program labelled "error".

At the completion of the verify program, for reasons which will be explained below, the microprocessor 45 will send a message to the energy controller 11 to replace the time of day in the energy controller 11 with the time of day derived from that kept in the programming unit. The status data in the RAM 47 are stored in the RAM 47 by connecting the microprocessor 45 via an input terminal 59 to a PC computer 61 as shown in FIG. 1. The PC computer 61 is connected to the input terminal 59 of the portable programming unit 27 via an interface 63, which converts the PC output signals to a form compatible with the microprocessor of the portable programming unit 27. To condition the programming unit 27 to receive data from the computer 61 both panel buttons 51 and 53 are pressed simultaneously for five seconds. The status data is entered into the memory of the computer 61 by means of the keyboard of the computer 61 and then transmitted to the microprocessor 45 which stores the data received from the PC computer 21 in the RAM 47.

If the operator wants to change the status data in the energy controller 11, the operator presses the panel button 51 labelled "program" and in response to actuation of this panel button, the microprocessor 45 under the control of the program in the EPROM 43 will transmit all of the status data in the RAM 47 and the calendar time data kept by the calendar time keeper 49 to the energy controller 11, which will replace the status data stored in this memory with the status data received from the portable programming unit 27. The last item of status data transmitted to the energy controller will be the time of day. When the portable 27 transmits the new time of day to the energy controller, it takes the time of day maintained by the calendar time keeper 49 and changes it by a random variable, ranging from minus four minutes to plus four minutes. The reason for adding this random variable to the time of day is to make the energy controllers at different consumer locations be unsynchronized, but within 8 minutes of each other. This variation in time of day avoids the energy controllers at different consumer locations from turning on the water heaters at the same time and causing an undesirable power surge, as would otherwise normally occur at the end of a peak power interval.

As shown in FIG. 4, the microprocessor 45 is energized by means of a rechargeable battery 65. The rechargeable battery also energizes the RAM 47 by means of an electronic switch 67 when the microprocessor is carrying out a program of the EPROM 45 either in response to actuation of the verify button 53, the program button 51 or actuation of both buttons simultaneously to receive information from the computer 61. The calendar time keeper 49 on the other hand, is powered by a lithium battery 69. As the last step of each program carried out by the microprocessor 45 either in response to the verify button, to verify the status data in the energy controller 11, or in response to the actuation of the program button 51 to replace the status data in the energy controller 51 with the status data in the RAM 47, or in response to actuation of both buttons simultaneously to replace the status data in the RAM 47 with status data transmitted from the PC computer 61, the microprocessor 45 opens the electronic switch 67 and then opens an electronic switch internally to disconnect the rechargeable battery from the microprocessor 47 so that power from the rechargeable battery 65 is used only when the microprocessor is carrying out a program. Actuation of one of the buttons 51, or 53, or both of the buttons will reconnect the rechargeable battery 65 to the microprocessor 45 and also close an the electronic switch 67 to reconnect the RAM 47 to the rechargeable battery 65. The lithium battery 69 is connected to the interconnection of the electronic switch 67 and the power input terminal of the RAM 47 by means of a diode 71. The lithium battery 69 will have a lower voltage than the rechargeable battery 65 and the polarity of the diode 71 will shut off current flow between the RAM 47 and the lithium battery 69 when the electronic switch 67 is closed. When the electronic switch 67 is open, power from the lithium battery 69 to the RAM 47 will be sufficient to maintain the data stored in the RAM 47 and updated by the calendar time keeper 49. With the lithium battery 69 used for only these purposes, only a small amount of power from the lithium battery is required As a result, the lithium battery 69 will last for ten years. The output voltage of the rechargeable battery 65 is sensed by a battery voltage detector 73 and when the rechargeable battery output voltage 65 drops below a level which indicates that the battery 65 needs recharging, the battery voltage detector 73 will energize a blinking signal lamp 75 on the top panel of the portable programming unit to indicate that the rechargeable battery 65 needs recharging. The signal lamp 75 is labelled "low batt".

Figure 5:
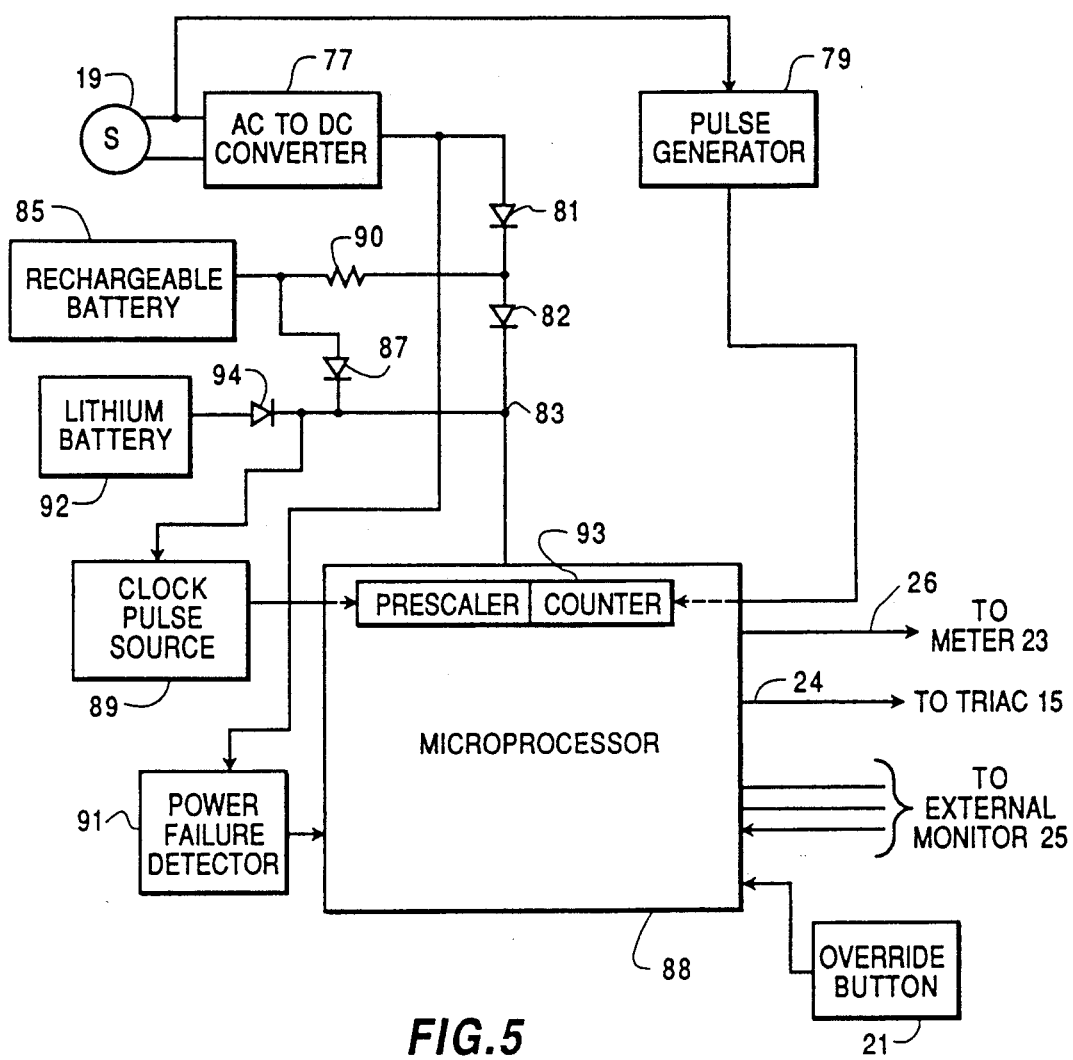
FIG. 5 is a block diagram illustrating the circuitry employed in the energy controller of the system of the invention.

FIG. 5 illustrates the circuitry of the energy controller 11. As shown in FIG. 5, the energy controller receives power from the household AC power supply 19 and applies it to an AC-to-DC converter 77 and also to a pulse generator 79. The AC-to-DC converter 77 converts the AC power to a DC voltage and applies it through diodes 81 and 82 to a junction 83 which is also connected to receive power from a rechargeable battery 85 through a diode 87. If the household power supply is not interrupted, the DC voltage from the AC to DC converter 77 passing through the diodes 81 and 82 will be greater than the voltage of the rechargeable battery 87 and the diode 87 will be back biased. A resistor 90 connects the junction of the diodes 81 and 82 to the rechargeable battery to recharge it when power is available from the power source 19. Power from the junction 83 is applied directly to a microprocessor 88 and to a high frequency clock pulse source 89 external to the microprocessor 88. Should the power from the household AC source 19 fail, power will be supplied from the internal battery source 85 through the diode 87 to the microprocessor 88 and to the clock pulse source 89. A lithium battery 92 is connected to the junction 83 through a diode 94 to supply power to the system in those rare instances when supply 19 is interrupted for a sufficiently long period of time to discharge the rechargeable battery. The lithium battery has a lower voltage than the rechargeable battery when charged so the diode 94 will be back biased except when the lithium battery 92 is called upon to supply power. Also, should power fail, the drop in voltage at the AC-to-DC converter 77 will be detected by a power failure detector 91 which in turn will signal the microprocessor 77 that the output power from the AC-to-DC converter 77 has failed.

The pulse generator 79 generates one pulse for each half cycle of the AC voltage and thus, generates 120 pulses per second. Pulses generated by the generator 79 are counted by a counter 93 in the microprocessor 88. The counter 93 is controlled, when AC power is present, to recycle every 120 pulses from the pulse generator 79 and thus, the counter 93 recycles once every second. Should the power from the power source 19 fail, the resulting drop in voltage from the AC-to-DC converter 77 will be detected by the power failure detector 91 which will signal the microprocessor 88 accordingly. In response to receiving this signal, the microprocessor 88 will apply pulses to the counter 93 derived from the clock pulse source 89. The clock pulses generated by the clock pulse source 89 are at a high frequency and are frequency divided by a prescaler on the counter 93 before being counted by the counter 93. When power is restored, this fact will be detected by the power detector 71 and the counter 91 will then again count pulses from the pulse generator 79 instead of being derived from the clock pulse source 89. The microprocessor 88 as explained above includes a program to maintain calendar time, which is maintained in response to the counter 93 periodically recycling. Because the input to the counter 91 is switched from the pulse generator 79 to pulses derived from the clock pulse source 89 upon a power failure, the calendar time is maintained even though there is a power failure.

In addition to calendar time, the microprocessor contains a listing of holidays, a listing of four subyearly time intervals, and a schedule of peak power periods for each subyearly time interval. The microprocessor 88 in response to the calendar time, the stored list of holidays, and the peak power schedule will generate, a power on or a power off output signal on line 24, which goes to the triac 15 indicating whether power to the water heater should be interrupted In response to this signal, the triac 15 will energize or deenergize the relay 13 and supply or interrupt power to the water heater. The microprocessor 88 will generate the power off signal on non-holiday weekdays only and will generate the power off signal on these weekdays during the peak power intervals as indicated in the schedule unless an override has been actuated by means of the override button 21. When the override button is actuated for the first time during any given day, this actuation will be detected by the microprocessor 88 and in response thereto for an override time period set in the status data of the microprocessor 88, the microprocessor 88 will generate the power on signal on line 24. As a result, the triac 15 will energize the relay 33 during the override period regardless of the calendar time and Peak power schedule In this manner, the interruption of the power to the water heater during peak power periods can be overridden by the user once each day for the set override time period.

Figure 6:
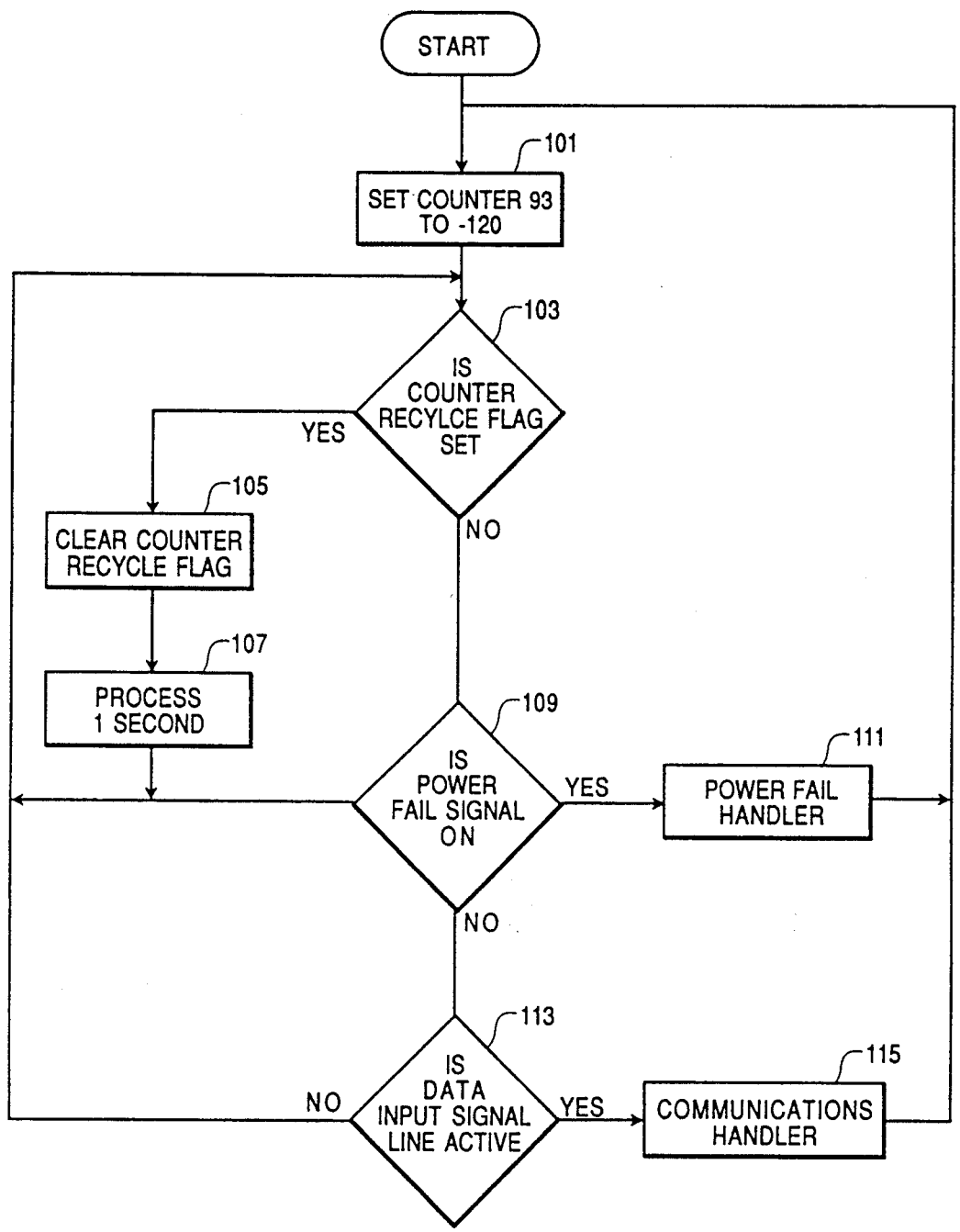
FIG. 6 illustrates a flowchart of the computer program employed by the energy controller of FIG. 6.

The flow chart for the overall program carried out by the energy controller 11 is illustrated in FIG. 6. As shown in FIG. 6, upon start up, the program for the energy controller first enters into an instruction set 101 in which the program sets the counter 93 so that it will recycle to zero upon counting 120 pulses. As pointed out above the counter 93 counts pulses from the pulse generator 79 when AC power is present. Following this initialization, the program enters into decision sequence 103, in which the program examines the counter 93 recycle flag Each time that the counter 93 recycles to zero, it causes the program to jump to a timer interrupt routine from wherever it is in the program. In this interrupt routine, it sets the counter recycle flag, and when AC power is present, the interrupt routine will set a count in the counter 93 to cause it to recycle to zero after counting 120 pulses from the pulse generator. Accordingly, the setting of the counter recycle flag will normally indicate that a second has elapsed If in decision sequence 103 the program determines that the counter recycle flag is set, it branches to instruction 105, in which the program clears the counter flag and then it enters into routine 107. This routine processes one second and includes steps for maintaining the clock calendar and controlling generation of the signals on the output lines 24 and 26. Following the processing of one second in routine 107, the program returns to decision sequence 103. If the recycle flag is not set in decision sequence 103, the program enters decision sequence 109, in which the program examines the input from the powerfail detector 91 to determine if the power failed signal is on indicating that there is a power failure. If there is a power failure, the program branches to the powerfail handler routine 111, which causes the counter 93 count pulses derived from the clock pulse source 89. If the powerfail signal is not on, the program proceeds from decision sequence 109 to decision sequence 113, in which the program examines the input signal line from the external module 25, to determine whether there is an input signal on this line indicating that the programming unit 27 is coupled to the external module 25 and is seeking to communicate with the microprocessor. If such a signal is present on the input signal line from the external module 25, the program branches to the communication handler routine 115. If there is no input signal on the input line from the external module 25, the program returns to the instruction sequence 103 and the program iteration repeats.

Sometimes the one second processing that occurs in the routine 107 will take longer than one second However these instances occur at most, only once every sixty seconds on a minute crossing, that is, when a minute has elapsed During the intervening 59 times that the program iterates through instruction sequences 105 and 107, the only thing done in routine 107 is incrementing the seconds counter. Accordingly, very little time is required to complete the instruction sequences 105 and 107 except on each minute crossing Because the program branches to the routine 107, each time the recycle flag is set, which flag is cleared in instruction sequence 105, the program has almost two seconds to complete the instruction sequence 107 on the minute crossings.

The communication handler routine normally requires substantially longer than two seconds and accordingly, at the completion of this routine, the time of the day in the calendar time maintained by the microprocessor 88 will no longer be correct. For this reason, at the end of each program carried out by the portable programming unit 27 in communicating with the energy controller 11, the programming unit 27 will reset the daily clock time in the energy controller 11 to a time derived from the daily clock time in the portable programming unit. In this manner, the fact that the communication handler routine 115 takes longer than two seconds, does not prevent the energy controller 11 from maintaining the time of day accurately.

Figure 7B:
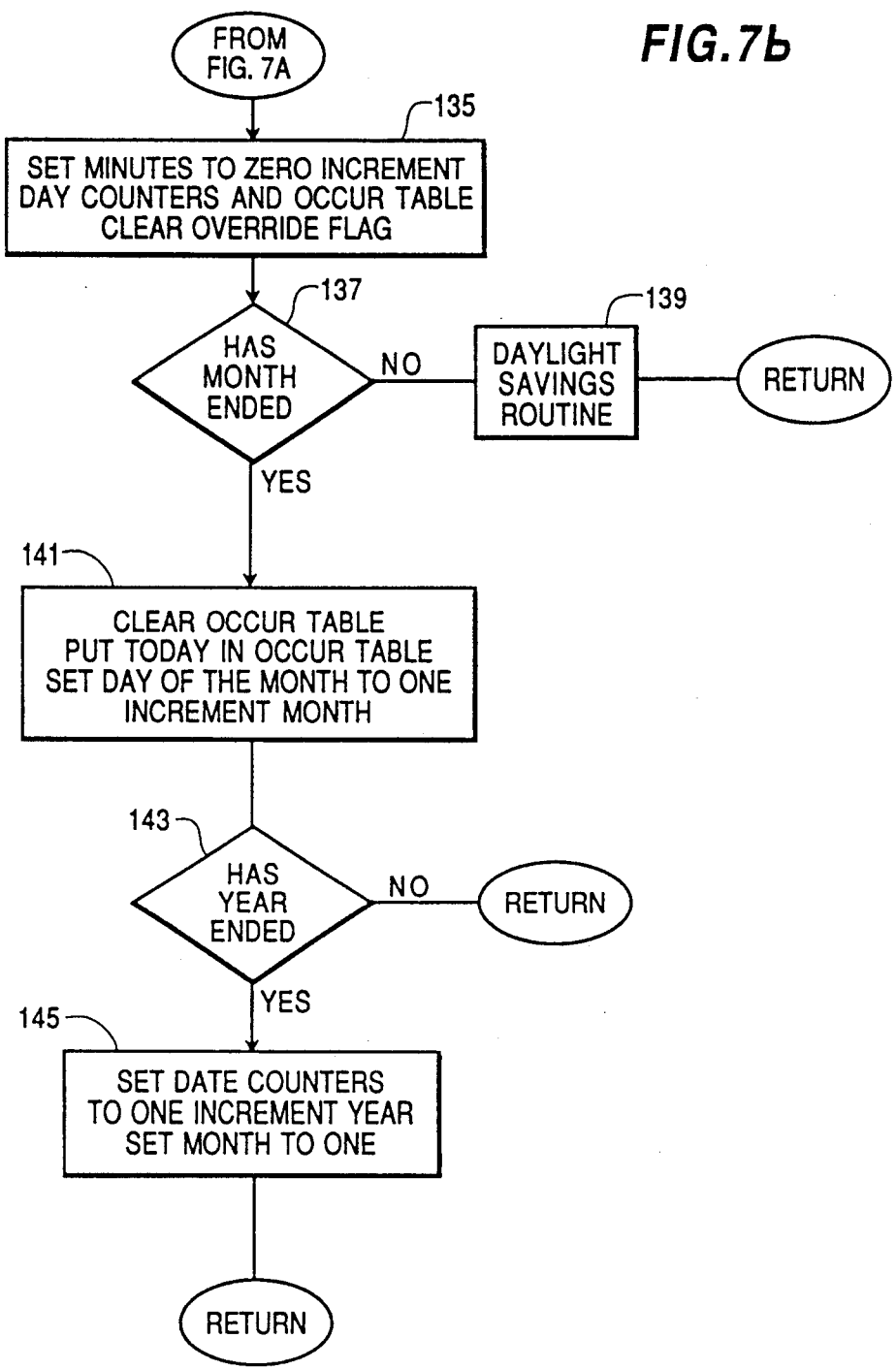

FIG. 7a and 7b illustrate a flow chart of the routine 107 for processing one second. As shown in the flow chart, the program first carries out instruction 117 in which it increments the seconds counter. After this instruction is performed, the program enters decision sequence 119 in which the program determines whether the conditions for entering into the override instruction sequence are present. This is determined by checking (1) whether the override button is actuated (2) that the override clock is not 0, indicating that an override is currently being carried out, and (3) that the override button has not already been actuated on this day, as indicated by an override flag not being set. If all of these conditions are present, the program branches from decision sequence 119 to instruction sequence 121, in which it sets the override flag, switches the signal on to output line 24 to the power on signal to cause the triac 15 to energize to the relay 13 and apply power to the water heater. In addition, it switches the signal on output line 26 to the electric meter to the high charge rate signal to indicate to the electric meter to charge at the high charge rate. If the signal on line 24 is already the power on signal, then this signal will be unchanged by instruction sequence 121. Following the completion of instruction sequence 121, the program enters instruction sequence 123. If in decision sequence 119 the program determines that conditions do not call for a branch to the override instruction sequence 121, the program proceeds into decision sequence 123 bypassing instruction sequence 121. In decision sequence 123, the program determines whether a minute has passed by the count in the seconds counter. If the count in the seconds counter has not reached 60, this means that a minute has not passed and the program returns to the main program shown in FIG. 6 and reenters decision sequence 103. If a minute has passed, the program enters instruction sequence 125, in which it increments the minutes counter and resets the seconds counter. Following this instruction sequence, the program enters decision sequence 127, in which the program determines whether an override is running, that is if the override counter contains a number other than 0. If an override is running, the program branches to instruction 129, in which the program decrements the override counter. If in instruction sequence 127, the program determines an override is not running, the program proceeds into instruction sequence 131, in which the program determines (1) whether it is a weekday or weekend and if it is a weekday, whether it is holiday. If it is a weekday, and it is not a holiday, it then compares the time of day with the peak power time interval schedule for that day in accordance with the peak power schedule for the yearly subinterval in which the current Julian date occurs. To determine whether it is a holiday, the program examines each of the holiday entries and a holiday table and compares the date with each holiday listed in the holiday table to make the determination if whether the current day is a holiday. To determine whether a current day is a holiday, the calendar time which is maintained by the microprocessor 88 of the energy controller keeps track of the year in a year counter, the month in a month counter, the Julian date in a Julian date counter, the day of the month in a date counter, the day of the week in a day of the week counter, and the number of times that each day of the week has occurred in the current month in an occur table. The Julian date is defined as the day of year numbered consecutively from January 1. Determination of holidays which always fall on the same day of the year are determined quite simply by comparing the current date with the date listed in the holiday schedule. If the holiday is a formula holiday, such as the second Monday of the month, then the program has to compare the holiday entry formula with the month counter, the day of the week counter, and occur table. Accordingly, if the formula holiday indicates that a holiday should occur on the second Monday of February, the program upon reaching this holiday entry in the holiday table, after determining that the month and the day of the week coincide, checks the occur table to see if it is the second Monday and in this manner determines whether the current date corresponds to this holiday. For a formula holiday of the type, for example which is identified as the last weekday of a month, the program again checks the month counter to determine whether the month coincides, and then checks the day of the week counter to see if it coincides with the holiday entry and then adds 7 to the day of the month and checks the resulting sum to see if it is greater than the number of days in the current month. If the resulting sum is greater than the current number of days in the week, this means that the current day of the week is the last such day of the week in the month. Before checking the holiday table, the program checks each entry in the edit table, in which any holiday in the holiday table can be changed to a different day or eliminated. Finally, the program checks the entries in the add table in which any new holiday can be added.

As pointed out above, if in instruction sequence 131, the program determines that the current day is a holiday the program does not switch the output signal on output line 24 to the power off signal regardless of the peak power schedule and the fact that the day is a weekday. Also, if in instruction sequence 131, the program determines from the day of the week counter that the day is on a weekend, the program also does not switch the signal to the power off signal on output line 24. Also in instruction sequence 131, the program determines whether the signal on line 26 should be switched to the opposite value. For example, if the program switches the output on line 24 to the power off signal, it will switch the signal on line 26 to the high charge rate signal. If the override counter is zero and the output on line 24 is the power on signal, the program will switch the output on line 26 to the low charge rate signal if it is not already at this value. Following instruction sequence 131 or following instruction 129 if the program branched to this instruction, the program enters decision sequence 133. In this decision sequence, the program determines whether the minutes counter has reached a count of 1,440, which would indicate that it is currently midnight and that a midnight crossing is occurring. If the minutes counter has not reached 1,440 in decision sequence 133, the program returns to the main program of FIG. 6 and again enters decision sequence 103.

If in decision sequence 133, the program determines that the minutes counter has reached a count of 1,440, in other words that it is currently midnight, the program enters instruction sequence 135 in which the program sets the minutes counter to 0, increments the day of the week counter, increments the Julian date counter, resets the override flag if this flag has been set, increments the day of the month, and increments the appropriate value in the occur table corresponding to the day of the week to which the day of the week counter has just been incremented. Thus, if the day of the week is Monday, then the Monday value, indicating how many Mondays have occurred during the current month, is incremented. If the year has ended, the program enters instruction sequence 145 to set the Julian date counter to one, set the day of the month to one, increment the year, and set the month to one. The program then returns to decision sequence 103 in the main program.

Following completion of instruction sequence 135, the program enters into decision sequence 137 in which the program determines whether the day of the month counter indicates that the date is past the end of the month, that is the day of the month counter is higher than the number of days there are in the given month. For the month of February, this value that the day of the month counter will be compared with will be either 28 or 29 depending on whether or not the year is a leap year. If the day of the month counter does not show the date to be past the end of the month, the program branches to instruction sequence 139, in which the program checks to determine whether the current date is the start of daylight savings time or is the end of daylight savings time. This check is made in the same way as checking for a holiday. If the current date is the date for the start of daylight savings time, the program sets the minutes counter to 60 and in this manner advances the current time by one hour. If the current date is the date for the end of daylight savings time and the daylight savings ended flag is not set, then in instruction sequence 139, the program sets the daylight savings ended flag and sets the minutes counter to −60 from which the counter must count up to zero before beginning counting positive increments. In this manner in effect, an hour is subtracted from the current time of day. If the daylight savings ended bit is already set, the program merely clears this bit and does not change the minutes counter. The daylight savings ended flag prevents another 60 minutes from being subtracted one hour later after the end of daylight savings is first determined. Following the completion of instruction sequence 139, the program returns to the main program to decision sequence 103.

If in instruction sequence 137, the program determines that it is past the end of the month, the program enters instruction sequence 141 in which all the values for each day of the week in the occur table are cleared and then the value for the current day of the week is set to one. In addition, the month counter is incremented and the day of the month is set to one. Following instruction sequence 141, the program enters decision 143 in which the program determines whether the year has ended by checking the month counter. If the count in the month counter equals 13, this indicates that the year has ended. If in decision sequence 143, the program determines that the year has not ended, the program returns to the main program at decision sequence 103.

Figure 8:
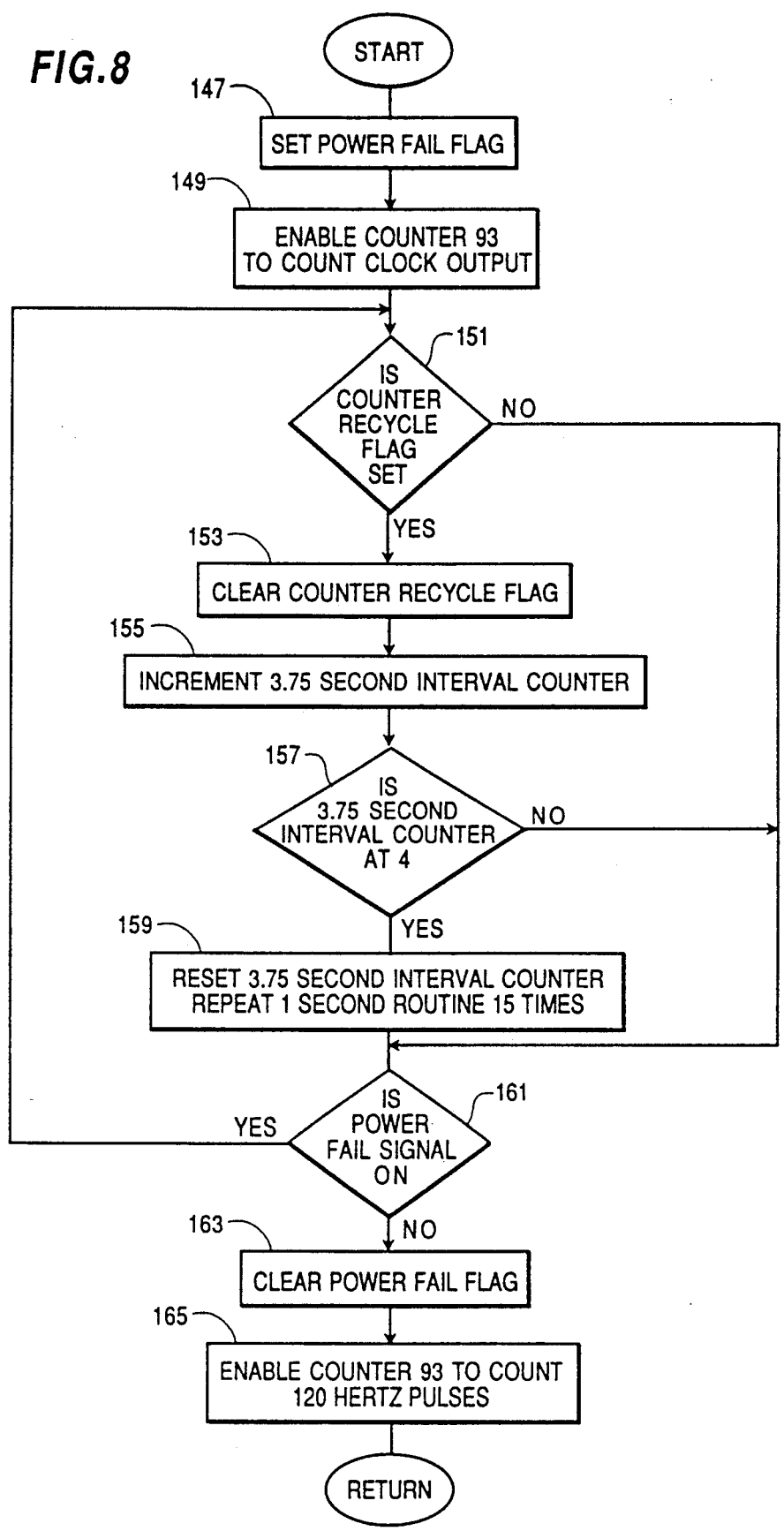
FIG. 8 is a flowchart of a routine employed in the program of FIG. 6 when power fails.

The powerfail handler routine, which is entered in the main program when in it is determined that the powerfail signal is on, is illustrated in the flow chart of FIG. 8. As shown in FIG. 8, this routine first performs instruction 147, in which it sets the powerfail flag. The program then enters instruction sequence 149 in which the counter 93 is enabled to count pulses from the prescaler which frequency divides the pulses from the clock pulse source 89 down to a relatively low frequency. In this mode of operation, the counter 93 counts to capacity and then recycles to zero whereupon it begins counting from zero. Each time the counter 93 recycles to zero the program jumps to the timer interrupt routine and sets the counter recycle flag, but the interrupt routine, in response to the powerfail flag being set, does not set a starting value in the counter 93. As a result, the counter 93 in this mode of operation recycles every 3.75 seconds instead of every second as it does in the normal mode of operation when it is counting pulses from the pulse generator 79. After completing instruction sequence 149 in the powerfail handler routine, the program enters decision sequence 151 in which the program determines whether the counter recycle 93 flag has been set. If the flag has been set indicating that an interval of 3.75 seconds has elapsed, the program proceeds to instruction 153, which clears counter recycle flag. Next the program performs instruction 155 in which the 3.75 second interval counter is incremented. Following this instruction, the program enters decision sequence 157, in which it is determined whether the 3.75 second interval counter has reached a count of 4. If the counter has reached a count of 4 this will mean an interval of 15 second has elapsed. If so, the program enters routine 159 in which the 1 second routine described with reference to FIGS. 7a and 7b is repeated 15 times to advance the clock 15 seconds as well as carry out any control functions called for in the routine if and when they occur. While this sequence is occurring, the counter 93 will continue to count the frequency divided pulses from the prescaler. In this manner, the time in the calendar clock is accurately maintained during a power failure.

At the completion of routine 159, the program enters decision sequence 161. If in decision sequence 151 it is determined that the counter recycle flag has not been set, or if in the routine 157, it is determined that the 3.75 second interval counter has not reached 4, the program branches directly into the decision sequence 161. In decision sequence 161, the power handler program determines whether the power failure signal is still on. If the signal is still on, the program branches back to instruction sequence 149 and the program reiterates through the routine. If in decision sequence 161 it is determined that the power failure signal is no longer high, the program proceeds to instruction 165, in which the powerfail flag is cleared, whereupon the program enters instruction sequence 93, in which the program again switches the counter 93 to count the 120 hertz pulses from the pulse generator 79. Following instruction sequence 165, the program returns to the main program and performs instruction 101.

Figure 9:
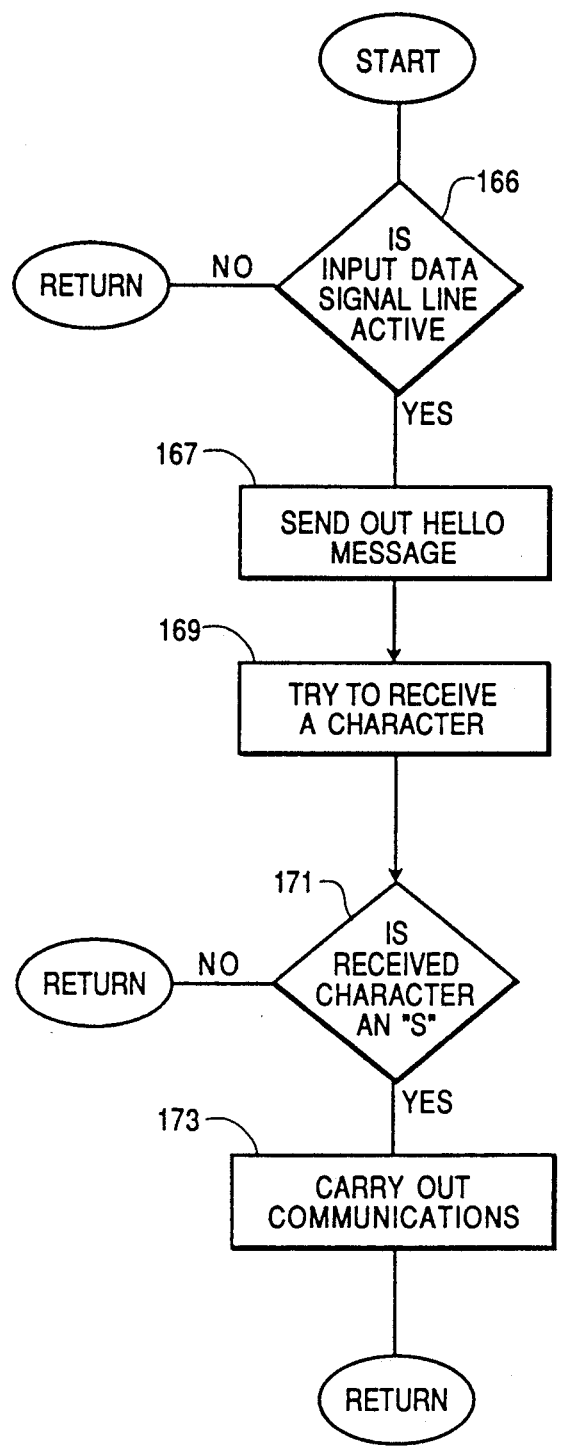
FIG. 9 is a flowchart illustrating a routine employed in the program of FIG. 6 to carry out communications between the energy controller and the programming unit.

FIG. 9 is flowchart for the communications handler routine 115 of the main program shown in FIG. 6. Upon entering this routine, the program first enters decision sequence 166, in which the program determines whether the input signal line from the external module is still active indicating that the portable programmer is still trying to communicate with the energy controller. If the line is not active, this means that the signal detected in instruction sequence 113 in the main program illustrated in FIG. 6 was erroneous. On making a determination in decision sequence 166 that the input signal is not active, the program returns to the main program at instruction 101. If in decision sequence 165 it is determined that the communication input line is still active, the program proceeds to instruction sequence 167 in which the program sends out a hello message to the programming unit 27. In response to receiving this hello message the programming unit should send the character "S" to the energy controller. Following instruction sequence 167, the program enters into instruction 169, in which the program tries to receive a character from the programming unit. Following instruction sequence 169, the program enters into decision sequence 171 in which it is determined whether a character "S" was received in instruction sequence 169. If the character "S" was not received in instruction sequence 169, this means that the portable programming is malfunctioning or the program transmitter in fact is not connected, whereupon the communication handler routine returns to the main program at instruction sequence 101. If in decision sequence 171 it is determined that a character "S" was received in instruction sequence 169, the program will enter the command mode whereupon the communication with and called for by the portable programming unit coupled to the external module is carried out.

The above described system provides an effective and yet relatively inexpensive system for automatically time shifting the application of power to a water heater without inconveniencing the consumer. It will be appreciated that the system is also applicable to other electrical appliances which are susceptible to having their periods of operation time shifted without significantly inconveniencing the consumers, such as for example air conditioning units, electrical heating units, pool pumps, or irrigation pumps. Also, as described above, the unit generates signals to the electric meter to control the charge rate of the meter. It will be appreciated that the system could be used just for this function and not control any appliances The above description is of a preferred embodiment of the invention and many modifications may be made thereto without departing from the spirit and scope of the invention, which is defined in the appended claims.

We claim:

1. An energy controlling system for a dwelling having a dwelling enclosure said energy controller comprising an energy controller within said dwelling enclosure having means to store a schedule of daily peak power usage and to keep current time, and means responsive to the current time kept by said energy controller and the schedule of daily peak power usage stored by said energy controller to control electrical power equipment in accordance with the schedule stored by said energy controller, a communications module external to said dwelling enclosure connected to said energy controller, a portable programming unit adapted to be coupled to said external module, said portable programming unit having means to keep current time, means to store a schedule of daily peak power usage, and communication means operable when coupled to said external module to change the schedule of daily peak power usage stored in said energy controller and the time kept by said energy controller to correspond with the schedule of daily peak power usage stored in said portable programming unit and the time kept by said portable programming unit.

2. An energy controlling system as recited in claim 1, wherein said portable programming unit has means operable when said portable programming unit is coupled to said external module to compare the schedule of daily peak power usage stored in said energy controller with the schedule of daily peak power usage stored in said portable programming unit and to compare the current time kept by said energy controller with the current time kept by said portable programming unit and to indicate the results of the comparisons.

3. An energy controlling system as recited in claim 1, wherein said communications module has an external sidewall with a predetermined noncircular shape and wherein said portable programming unit has a recess shaped to fit with said predetermined shape of said external sidewall, said portable programming unit being coupled to said communications module when said communications module is inserted in said recess.

4. An energy controlling system as recited in claim 3, wherein said communications module and said recess define an infrared signal light communications interface when said communications module is received in said recess.

5. An energy controlling system as recited in claim 1, wherein said communications module includes a signal lamp and said energy controller comprises means to energize said signal lamp when said energy controller is operating.

6. An energy controlling system as recited in claim 3, wherein said communication means comprises first and second signal channels extending between said portable programming unit and said communications module and being spatially separated at the interface between said portable programming unit and said communications module.

7. An energy controlling system for a dwelling having a dwelling enclosure comprising an energy controller within said dwelling enclosure said energy controller having means keep current time, and means responsive to the current time kept by said energy controller and the schedule of daily peak power usage stored by said energy controller to control electrical power equipment in accordance with the schedule stored by said energy controller, a communications module external to said dwelling enclosure connected to said energy controller, a portable programming unit adapted to be coupled to said external module, said portable programming unit having means to keep current time, means to store a schedule of daily peak power usage, means operable when said portable programming unit is coupled to said external module to compare the schedule of daily peak power usage stored in said energy controller with the schedule of daily peak power usage stored in said portable programming unit and to compare the current time kept by said energy controller with the current time kept by said portable programming unit and to indicate the results of the comparisons.

8. An energy controlling system as recited in claim 7, wherein said communications module has an external sidewall with a predetermined noncircular shape and wherein said portable programming unit has a recess shaped to fit with said predetermined shape of said external sidewall, said portable programming unit being coupled to said communications module when said communications module is inserted in said recess.

9. An energy controlling system as recited in claim 8, wherein said communications module and said recess define an infrared signal light communications interface when said communications module is received in said recess.

10. An energy controlling system as recited in claim 7, wherein said communications module includes a signal lamp and said energy controller comprises means to energize said signal lamp when said energy controller is operating.

11. An energy controlling system as recited in claim 8, wherein said communication means comprises first and second signal channels extending between said portable programming unit and said communications module and being spatially separated at the interface between said portable programming unit and said communications module.

12. An energy controlling system comprising means to store a schedule of daily periods of peak power usage, computer program means keeping current time including interrupt means to immediately set a flag upon the expiration of each second, said computer program means repeatedly checking whether said flag is set and upon determining that said flag has been set, clearing said flag and then performing a series of steps to keep track of elapsed seconds and minutes, said series of steps upon the elapse of each minute including comparing the current time with said schedule, power interrupting means responsive to the comparison by said computer program means to interrupt an electrical power to an electrical appliance during said periods of peak power usage, said computer program means taking longer than a second but less than two seconds to complete said series of steps upon the elapse of some of said minutes.

* * * * *